Patented Sept. 16, 1924.

1,508,862

UNITED STATES PATENT OFFICE.

CHARLES B. TRESCOTT, OF CHICAGO, ILLINOIS.

ART OF PREPARING LEGUMES OR SEEDS OF THE BEAN FAMILY BY LOW-TEMPERATURE COOKING.

No Drawing.      Application filed March 29, 1923. Serial No. 628,510.

*To all whom it may concern:*

Be it known that I, CHARLES B. TRESCOTT, a citizen of the United States, residing at Chicago, in the county of Cook and State of Illinois, have invented a new and useful Improvement in the Art of Preparing Legumes or Seeds of the Bean Family by Low-Temperature Cooking, of which the following is a specification.

My invention relates to a process of preparing, for consumption legumes or seeds of the bean family, comprising, beans, peas, lentils and the like, in a raw and dried condition, by subjecting them to low-temperature cooking and further treating the cooked product as hereinafter described, to retain therein its nutritive properties and flavor.

While my improved treatment is applicable with the desired effect to the different seeds referred to, it is especially advantageous when applied to beans, for which purpose I have more particularly devised it, and therefore confine thereto the description hereinafter contained.

The beans to be subjected to my improved treatment should be preliminarily prepared therefor by thorough washing, then covering them, in a suitable kettle or pan, with cold water and cooking for about five minutes, thereupon pouring off the water and repeating the washing in hot (but not boiling) water, which is poured off, when the washed beans are again covered with hot water and cooked the second time for about five minutes; and then, after pouring off this water, the beans are again covered with hot water.

In the last-named condition in which the beans have not been deprived of any of their nutritive properties or natural flavor, they are ready for my improved treatment, the first step in which involves their subjection, in the hot water covering them, as aforesaid, to low-temperature cooking, meaning temperature below the boiling-point of water and preferably of about 180° to 200° F. For this purpose the water-covered beans, in a suitable pan or dish, and in any desired number thereof, are placed in a cooking chamber, or oven, the temperature of which is maintained below the boiling point of water; and they are kept under subjection to that temperature until thoroughly cooked. This cooking extracts from the beans into the water in which they are cooked, much of their flavor and nutritive properties, which it is important for my purpose shall be returned to them; and I therefore drain off this water and save it for the use hereinafter described.

The next step in my process comprises exhausting moisture out of the cooked beans to reduce them to a condition of partial dryness. For this purpose they are put into the desired number of pans or dishes, to which the extract-containing water, in which they were cooked, is added, and these receptacles are introduced into an air-tight, suitably heated chamber, which may be heated by steam-pipes contained therein, the temperature for the purpose being preferably held at about 120° to 140° F.; and the resultant water-vapor is withdrawn from the chamber, as through the medium of a suitable exhaust-pump applied thereto, until the beans have been reduced to the low moisture-content desired, depending on the length of time of their subjection to the exhaust action.

The resultant cooked product has substantially all the extract matter that was contained in the water, restored therefrom to the beans, since it will not have been withdrawn from the chamber by exhausting the vapors therefrom, as hereinbefore described; and the product is ready for consumption. The moisture withdrawing treatment having restored to the beans their extracted flavor and nutritive properties, they afford a delicious and nourishing food.

However, the more extensive use intended for my improved product is for soup; and to prepare it for that purpose I further proceed as follows:

The moist beans are reduced, preferably after first chopping or grinding them, to a pulpous or paste-like form, and the pulp or paste is introduced into cans which are thereupon sealed and subjected to a temperature below the boiling-point of water, say about 180° to 200° F., for a sufficient length of time to sterilize their contents. While the bacteria in the pulp or paste will thereby be destroyed, to insure destruction also of the spores, I subject the matter to the same sterilizing process a second, and preferably also a third time, allowing about 24 hours for each subjection to permit the spores to hatch into bacteria, which the temperature below 212° F. kills but is not sufficiently high to impair the natural flavor and nutritive properties of the product, as a temperature materially higher than 212° F. would do.

Soup made of this sterilized product is rendered extremely palatable and nourishing by reason of the natural flavor and nutritive properties retained in the stock therefor thus prepared.

I claim:

1. The process of preparing for consumption legumes or seeds of the bean family, in moist condition, by cooking them at a temperature below the boiling point of water, thereby extracting therefrom into the cooking water their contained flavor and nutritive properties, thereupon heating them at said temperature in the extract-containing water and meanwhile exhausting the resultant water-vapors, for the purpose set forth.

2. The process according to preceding claiming-clause 1, characterized by the further steps of reducing the product to a pulpous or paste-like form, and subjecting the same to sterilization at a temperature below the boiling-point of water throughout a plurality of hours.

CHARLES B. TRESCOTT.